J. A. CALDWELL.
Implement for Fastening Hose-Straps.
No. 197,717. Patented Dec. 4, 1877.
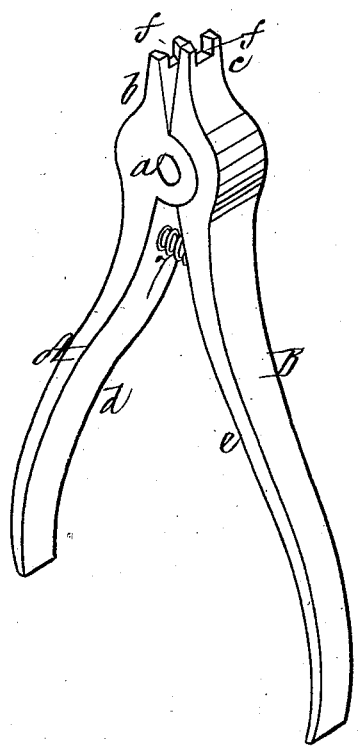
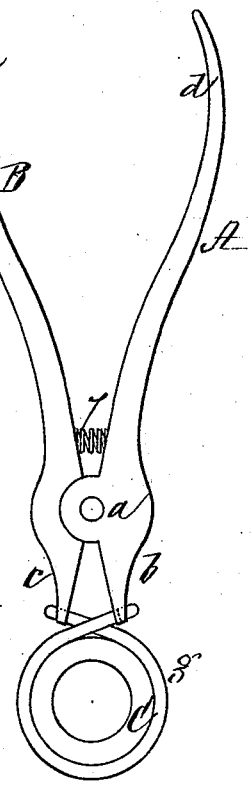
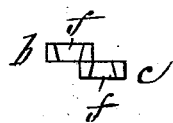
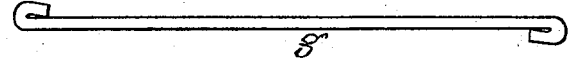
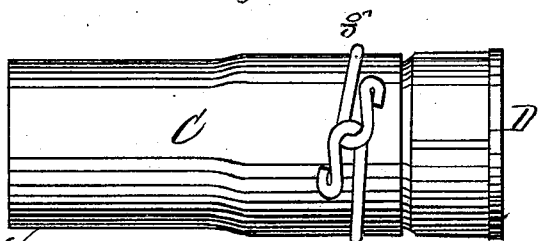
Witnesses,
W. J. Cambridge
J. E. Cambridge
Inventor,
John A. Caldwell
Per Teschemacher & Stearns,
Attorneys.

UNITED STATES PATENT OFFICE.

JOHN A. CALDWELL, OF BOSTON, MASSACHUSETTS.

IMPROVEMENT IN IMPLEMENTS FOR FASTENING HOSE-STRAPS.

Specification forming part of Letters Patent No. 197,717, dated December 4, 1877; application filed November 9, 1877.

*To all whom it may concern:*

Be it known that I, JOHN A. CALDWELL, of Boston, in the county of Suffolk and State of Massachusetts, have invented an Implement for Tightening and Fastening Straps or Bands Employed in Securing Hose to Couplings, of which the following is a full, clear, and exact description, reference being had to the accompanying drawings, making part of this specification, in which—

Figure 1 is a perspective view of my improved implement. Fig. 2 represents the manner in which my implement is applied in the operation of tightening and fastening bands for securing hose to couplings. Fig. 3 is an end view of the jaws of my implement, showing their relative position when closed. Fig. 4 represents the metallic band or strap I employ in securing hose to couplings, and for which my improved implement is specially adapted. Fig. 5 is a plan of a piece of hose secured to its coupling by means of the band shown in Fig. 4.

My present invention consists in a pair of levers pivoted together, and provided at their outer ends with grooved or notched jaws, which are so formed that when closed or brought together the grooves of one will be located to one side of, and not in line with, the groove in the other, whereby the implement may be applied to both ends of the band to tighten and twist it, as is necessary in the operation of securing the hose thereby to the coupling.

To enable others skilled in the art to understand and use my invention, I will proceed to describe the manner in which I have carried it out.

In the said drawings, A B represent two bent levers, pivoted together at *a*, the two shorter arms of these levers forming jaws *b c*, and the two longer arms *d e* serving as handles for the implement. These handles are arranged opposite each other, in one and the same plane, and in their open or normal position are kept apart by a spiral spring, 7, placed between them a short distance from the pivot *a*.

Each of the jaws *b c* is provided at its outer end with a groove or notch, *f*, extending transversely across it, and the shorter arms of the levers A B incline laterally in opposite directions, the position of the two grooves not being in line, but to one side of each other.

The opposite faces of each groove taper outward from the inside of the jaw to its outside, (see Fig. 3,) this construction best adapting the jaws for the office which they are to perform—viz., to hold the enlarged ends of a metallic band or strap, *g*, of the form seen in Fig. 4, this strap forming the subject of an application for Letters Patent made simultaneous with this, and intended for use in securing one end of a section of hose, C, to the corrugated neck of one portion of a coupling, D.

After the band *g* is bent around the hose at the required point, the jaws *b c* are so applied to the enlarged ends of the band that each end will rest within one of the grooves and project inside of the inner face of its jaw, in which position the two enlarged ends will lie side by side without interfering with each other. The handles *d e* are now brought together against the resistance of the spring 7, which operation causes the jaws *b c* to separate, and the enlarged ends of the band to be wedged firmly between the beveled faces of the grooves, a strong purchase being thus obtained for tightly drawing the band around the hose, the portion of which thereunder is forced into the corrugations of the coupling. When held in this position by the jaws, the two enlarged ends of the band extend beyond or lap by each other, and to securely fasten them together it is simply necessary to turn the jaws partially around by a movement of the hand till the portions of the band inside of and near its enlargements are crossed and interlocked with each other, when the ends are bent down, as seen in Fig. 5, and the operation is completed.

What I claim as my invention, and desire to secure by Letters Patent, is—

The within-described implement for tightening and fastening metallic straps or bands used for securing hose to couplings, consisting of the levers A B, pivoted together, and having jaws *b c*, provided with grooves or notches *f f*, located out of line with each other, when constructed to operate substantially in the manner and for the purpose set forth.

Witness my hand this 7th day of November, A. D. 1877.

JOHN A. CALDWELL.

In presence of—
 N. W. STEARNS,
 W. J. CAMBRIDGE.